(12) United States Patent
Dar et al.

(10) Patent No.: US 12,411,958 B2
(45) Date of Patent: Sep. 9, 2025

(54) EARLY AND ADAPTIVE STREAM SAMPLING SYSTEM AND METHOD FOR MACHINE LEARNING-BASED OPTIMIZATIONS IN STORAGE SYSTEMS

(71) Applicant: Dell Products L.P., Round Rock, TX (US)

(72) Inventors: Shaul Dar, Petach Tikva (IL); Ramakanth Kanagovi, Telangana (IN); Guhesh Swaminathan, Tamil Nadu (IN); Rajan Kumar, Bihar (IN)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 18/133,110

(22) Filed: Apr. 11, 2023

(65) Prior Publication Data

US 2024/0346150 A1    Oct. 17, 2024

(51) Int. Cl.
*G06F 21/57* (2013.01)
*G06F 21/56* (2013.01)

(52) U.S. Cl.
CPC .......... *G06F 21/577* (2013.01); *G06F 21/564* (2013.01)

(58) Field of Classification Search
CPC . G06N 20/00; G06F 2221/034; G06F 21/577; G06F 21/564
See application file for complete search history.

(56) References Cited

U.S. PATENT DOCUMENTS

| | | | |
|---|---|---|---|
| 8,116,575 B1* | 2/2012 | Saisan | G06V 10/764 382/160 |
| 10,860,730 B1 | 12/2020 | Weaver et al. | |
| 11,182,321 B2 | 11/2021 | Pinho et al. | |
| 11,361,197 B2 | 6/2022 | Calmon et al. | |
| 11,386,207 B2 | 7/2022 | Rosa et al. | |
| 11,561,701 B2 | 1/2023 | Singh et al. | |
| 11,829,486 B1* | 11/2023 | Lambotte | G06N 3/09 |
| 2007/0011745 A1* | 1/2007 | Mitomo | H04L 63/1425 726/22 |
| 2011/0067106 A1* | 3/2011 | Evans | G06F 21/552 709/224 |
| 2012/0114206 A1* | 5/2012 | Avinash | G16H 30/40 382/131 |

(Continued)

*Primary Examiner* — Tod R Swann
*Assistant Examiner* — Amir Mahdi Hajiabbasi
(74) *Attorney, Agent, or Firm* — BainwoodHuang (57) ABSTRACT

Techniques for performing early and adaptive IO stream sampling for ML-based optimizations in a storage system. The techniques include obtaining a sub-slice of sampled data by performing early sampling of a slice of successive operations directed to a storage object. The techniques include generating features based on the sub-slice, processing the features using an ML model, and generating a probability score based on the ML model's output. The techniques include determining that the probability score falls within an overlap range of continuous variable distributions for benign and threat classes of data. The techniques include, in response to the probability score exceeding a specified threshold, comparing a class signature of the sub-slice with a target class signature of the threat class of data to determine a similarity between the class signatures, and, in response to the similarity exceeding a predetermined similarity level, assigning a "threat" class label to the probability score.

20 Claims, 4 Drawing Sheets

(56) References Cited

U.S. PATENT DOCUMENTS

| | | | |
|---|---|---|---|
| 2014/0033307 A1* | 1/2014 | Schmidtler | H04L 63/1483 |
| | | | 726/22 |
| 2016/0253498 A1* | 9/2016 | Valencia | G06N 20/00 |
| | | | 726/23 |
| 2020/0233598 A1 | 7/2020 | Bezugly et al. | |
| 2022/0012672 A1* | 1/2022 | Inman | G06Q 10/1053 |
| 2022/0131879 A1* | 4/2022 | Naik | H04L 63/1416 |
| 2022/0350484 A1 | 11/2022 | Vankamamidi et al. | |
| 2023/0023584 A1* | 1/2023 | Sternfeld | G06F 21/6218 |
| 2023/0124621 A1* | 4/2023 | Umesh | G06F 21/552 |
| | | | 726/23 |
| 2024/0095352 A1* | 3/2024 | Salman | G06F 21/564 |

* cited by examiner

EARLY AND ADAPTIVE STREAM SAMPLING SYSTEM AND METHOD FOR MACHINE LEARNING-BASED OPTIMIZATIONS IN STORAGE SYSTEMS

BACKGROUND

Storage systems include processing circuitries and storage arrays containing storage drives (or devices) such as solid-state drives (SSDs), flash drives, and hard disk drives (HDDs). The processing circuitries perform input/output (IO) operations in response to storage IO requests issued by host (or client) computers coupled to the storage systems over a network. The IO operations (e.g., read IO operations, write IO operations) cause data blocks, data pages, data files, or other data elements specified in the storage IO requests to be read from or written to volumes, logical units, filesystems, or other storage objects maintained on the storage devices of the storage systems. From time to time, the storage systems may be subject to security threats or attacks such as ransomware attacks, which may infect client and/or other computers on the network with malware and systematically encrypt data files or other data elements associated with the infected computers. Once the data files of the infected computers have been encrypted, ransomware attackers may withhold keys for decrypting the data files unless and until monetary ransoms are paid by victims of the attacks.

SUMMARY

To monitor and/or detect security threats such as ransomware attacks, a storage system can execute a security threat detection process, which can include sampling sequences, streams, or slices of successive IO (or non-IO) operations directed to a storage object, generating a plurality of relevant features based on the sampled data slices, processing the plurality of relevant features using a machine learning (ML) model, and generating, based on an output of the ML model, at least one inference (or probability) score or classification indicating a likelihood (or probability) that a ransomware attack has occurred involving the storage object. In some embodiments, the storage system can perform interval-based sampling to sample the slices of successive IO (or non-IO) operations, allowing the probability score(s) or classification(s) to be generated with increased accuracy from the ML model's output, while reducing the storage system's processing and/or memory resource requirements.

Techniques are disclosed herein that can maintain benefits of increased accuracy of security threat detection and reduced requirements of processing and/or memory resources, while allowing security threats or attacks such as ransomware attacks to be monitored and/or detected earlier. The disclosed techniques can employ an approach referred to herein as "early sampling" to sample slices of IO (or non-IO) operations, which are successive, ordered by time, and directed to the same storage object maintained on a storage device of a storage system. In some embodiments, the early sampling approach can include sampling a predetermined amount, number, or percentage of successive IO (or non-IO) operations within a predefined sampling interval at the start of each slice directed to the storage object.

The disclosed techniques can include obtaining at least one sub-slice of sampled data by performing early sampling of at least one slice of successive IO (or non-IO) operations directed to a storage object maintained on a storage device of a storage system, and generating a plurality of relevant features based on the sub-slice of sampled data. The disclosed techniques can include processing the plurality of relevant features using an ML model, and generating a probability score based on an output of the ML model. The disclosed techniques can include determining that the probability score falls within a range of overlap of continuous variable distributions for a benign class of data and a threat class of data. The disclosed techniques can include, in response to the probability score falling above a specified threshold within the range of overlap, comparing a class signature of the sub-slice of sampled data with a target class signature of the threat class of data to determine a similarity between the respective class signatures. The disclosed techniques can include, in response to the determined similarity between the respective class signatures exceeding a predetermined similarity level, assigning a "threat" class label to the probability score and optionally performing a remedial action on the storage system to address a perceived security threat.

In certain embodiments, a method of detecting a security threat in a storage system using a machine learning (ML) model includes obtaining a sub-slice of sampled data by performing early sampling of a slice of successive input/output (IO) or non-IO operations directed to a storage object maintained on a storage device of a storage system, generating a plurality of relevant features based on the sub-slice of sampled data, processing the plurality of relevant features using an ML model, generating a probability score for the sub-slice of sampled data based on an output of the ML model, and determining that the probability score falls within a range of overlap of continuous variable distributions for a benign class of data and a threat class of data. The method includes, in response to the probability score falling above a specified threshold within the range of overlap, comparing a class signature of the sub-slice of sampled data with a class signature of the threat class of data to determine a similarity between the respective class signatures, and, in response to the similarity between the respective class signatures exceeding a predetermined similarity level, assigning a "threat" class label to the probability score, and performing a remedial action on the storage system to address a perceived security threat involving the storage object.

In certain arrangements, the method includes sampling a predetermined percentage of IO or non-IO operations within a predefined sampling interval at a start of the slice of successive IO or non-IO operations.

In certain arrangements, the continuous variable distributions include a majority class distribution for the benign class of data and a minority class distribution for the threat class of data, and the range of overlap includes a first range of overlap below the specified threshold and a second range of overlap above the specified threshold. The method includes determining where the probability score falls within one of the first range of overlap and the second range of overlap.

In certain arrangements, the method includes, in response to the probability score falling within the first range of overlap, assigning a "low risk" class label to the probability score.

In certain arrangements, the method includes, in response to the probability score falling within the second range of overlap and the similarity between the respective class signatures being less than the predetermined similarity level, assigning a "high risk" class label to the probability score.

In certain arrangements, the method includes, in response to assigning the "high risk" class label to the probability score, maintaining a high sampling rate within the predefined sampling interval.

In certain arrangements, the method includes, in response to assigning the "low risk" class label to the probability score, maintaining a medium sampling rate within the predefined sampling interval, the medium sampling rate being less than the high sampling rate.

In certain arrangements, the method includes, in response to the probability score falling below the specified threshold outside the range of overlap, maintaining a low sampling rate within the predefined sampling interval, the low sampling rate being less than the medium sampling rate.

In certain embodiments, a system for detecting a security threat in a storage system using a machine learning (ML) model includes a memory and processing circuitry configured to execute program instructions out of the memory to obtain a sub-slice of sampled data by performing early sampling of a slice of successive input/output (IO) or non-IO operations directed to a storage object maintained on a storage device of a storage system, generate a plurality of relevant features based on the sub-slice of sampled data, process the plurality of relevant features using an ML model, generate a probability score for the sub-slice of sampled data based on an output of the ML model, determine that the probability score falls within a range of overlap of continuous variable distributions for a benign class of data and a threat class of data, in response to the probability score falling above a specified threshold within the range of overlap, compare a class signature of the sub-slice of sampled data with a class signature of the threat class of data to determine a similarity between the respective class signatures, and in response to the similarity between the respective class signatures exceeding a predetermined similarity level, assign a "threat" class label to the probability score, and performing a remedial action on the storage system to address a perceived security threat involving the storage object.

In certain arrangements, the processing circuitry is configured to execute the program instructions out of the memory to sample a predetermined percentage of IO or non-IO operations within a predefined sampling interval at a start of the slice of successive IO or non-IO operations.

In certain arrangements, the continuous variable distributions include a majority class distribution for the benign class of data and a minority class distribution for the threat class of data, and the range of overlap includes a first range of overlap below the specified threshold and a second range of overlap above the specified threshold. The processing circuitry is configured to execute the program instructions out of the memory to determine where the probability score falls within one of the first range of overlap and the second range of overlap.

In certain arrangements, the processing circuitry is configured to execute the program instructions out of the memory, in response to the probability score falling within the first range of overlap, to assign a "low risk" class label to the probability score.

In certain arrangements, the processing circuitry is configured to execute the program instructions out of the memory, in response to the probability score falling within the second range of overlap and the similarity between the respective class signatures being less than the predetermined similarity level, to assign a "high risk" class label to the probability score.

In certain arrangements, the processing circuitry is configured to execute the program instructions out of the memory, in response to assigning the "high risk" class label to the probability score, to maintain a high sampling rate within the predefined sampling interval.

In certain arrangements, the processing circuitry is configured to execute the program instructions out of the memory, in response to assigning the "low risk" class label to the probability score, to maintain a medium sampling rate within the predefined sampling interval, the medium sampling rate being less than the high sampling rate.

In certain arrangements, the processing circuitry is configured to execute the program instructions out of the memory, in response to the probability score falling below the specified threshold outside the range of overlap, to maintain a low sampling rate within the predefined sampling interval, the low sampling rate being less than the medium sampling rate.

In certain embodiments, a computer program product includes a set of non-transitory, computer-readable media having instructions that, when executed by processing circuitry, cause the processing circuitry to perform a method including obtaining a sub-slice of sampled data by performing early sampling of a slice of successive input/output (IO) or non-IO operations directed to a storage object maintained on a storage device of a storage system, generating a plurality of relevant features based on the sub-slice of sampled data, processing the plurality of relevant features using an ML model, generating a probability score for the sub-slice of sampled data based on an output of the ML model, determining that the probability score falls within a range of overlap of continuous variable distributions for a benign class of data and a threat class of data, in response to the probability score falling above a specified threshold within the range of overlap, comparing a class signature of the sub-slice of sampled data with a class signature of the threat class of data to determine a similarity between the respective class signatures, and in response to the similarity between the respective class signatures exceeding a predetermined similarity level, assigning a "threat" class label to the probability score, and performing a remedial action on the storage system to address a perceived security threat involving the storage object.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for performing early and adaptive input/output (IO) stream sampling for machine learning (ML)-based optimizations in a storage system. The disclosed techniques can include obtaining at least one sub-slice of sampled data by performing early sampling of at least one slice of successive IO (or non-IO) operations directed to a storage object maintained on a storage device of a storage system. The disclosed techniques can include generating a plurality of relevant features based on the sub-slice of sampled data, processing the plurality of relevant features using an ML model, and generating a probability score based on an output of the ML model. The disclosed techniques can include determining that the probability score falls within a range of overlap of continuous variable distributions for a benign class of data and a threat class of data. The disclosed techniques can include, in response to the probability score falling above a specified threshold within the range of overlap, comparing a class signature of the sub-slice of sampled data with a target class signature of the threat class of data to determine a similarity between the respective class signatures, and, in response to the determined similarity exceeding a predetermined similarity level, assigning a "threat" class label to the probability score, and optionally performing a remedial action on the storage system to address a perceived security threat. The disclosed techniques can provide benefits of increased accuracy of security threat detection and reduced requirements of processing and/or memory resources, while allowing security threats or attacks such as ransomware attacks to be monitored and/or detected earlier.

Figure 1A:
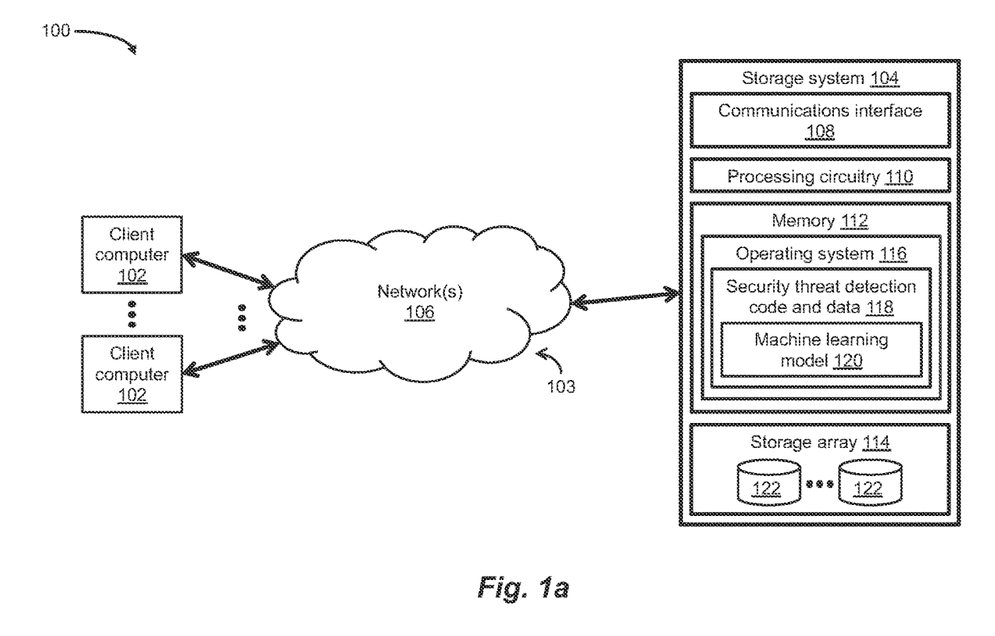
FIG. 1a is a block diagram of an exemplary storage environment, in which techniques can be practiced for performing early and adaptive input/output (IO) stream sampling for machine learning (ML)-based optimizations in a storage system.

FIG. 1a depicts an illustrative embodiment of an exemplary storage environment 100, in which techniques can be practiced for performing early and adaptive stream sampling for ML-based optimizations in a storage system. As shown in FIG. 1a, the storage environment 100 can include a plurality of host (or client) computers 102 communicably coupled to a storage system 104 by a communications medium 103, which includes at least one network 106. For example, each of the plurality of client computers 102 may be configured as an email server computer, a file server computer, a web server computer, and/or any other suitable client computer, server computer, or computerized device. The client computers 102 can be further configured to provide, over the network(s) 106, storage input/output (IO) requests (e.g., small computer system interface (SCSI) commands, network file system (NFS) commands) to the storage system 104. In response to the storage IO requests (e.g., read IO requests, write IO requests), one or more processors or processing circuitries of the storage system 104 can perform IO operations (e.g., read IO operations or read IOs, write IO operations or write IOs) that cause data blocks, data pages, data files, and/or any other suitable data elements specified in the storage IO requests to be read from or written to volumes (VOLs), logical units (LUs), filesystems, data streams, data extents, data slices, and/or any other suitable storage objects or elements maintained on one or more storage drives (or devices) 122. The storage system 104 can be configured as a standalone storage system including a single storage appliance, a clustered storage system including two or more storage appliances, a cloud-based storage system, or any other suitable storage system or appliance.

The communications medium 103 can be configured to interconnect the client computers 102 with the storage system 104 to enable them to communicate and exchange data and control signaling. As shown in FIG. 1a, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

As shown in FIG. 1a, the storage system 104 can include a communications interface 108, one or more processors (or, more generally, "processing circuitry") 110, at least one memory 112, and a storage array 114. The communications interface 108 can include an Ethernet interface, an InfiniBand interface, a Fiber Channel interface, and/or any other suitable communications interface. The communications interface 108 can further include SCSI target adapters, network interface adapters, and/or any other suitable adapters for converting electronic, optical, and/or wireless signals received over the network(s) 106 to a form suitable for use by the processing circuitry 110.

The processing circuitry 110 can be configured to perform IO operations (e.g., read IOs, write IOs) directed to a storage object maintained on one or more of the storage devices 122 within the storage array 114, as well as non-IO operations (e.g., control operations). The processing circuitry 110 can perform such IO operations in response to storage IO requests (e.g., read IO requests, write IO requests) issued by the respective client computers 102 to read/write host (or client) data from/to the storage devices 122 of the storage system 104. In some embodiments, the storage array 114 can be configured to implement a redundant array of independent disk (RAID) environment. The storage array 114 can include the storage devices 122 such as solid-state drives (SSDs), flash drives, hard disk drives (HDDs), hybrid drives, optical drives, and/or any other suitable storage drives or devices. The storage devices 122 can be configured to store VOLs, LUs, filesystems, data streams, data extents, data slices, and/or any other suitable storage objects for hosting data storage of client applications (e.g., email client applications, file client applications, web client applications) running on the respective client computers 102.

The memory 112 can include persistent memory (e.g., flash memory, magnetic memory) and non-persistent memory (e.g., dynamic random-access memory (DRAM), static random-access memory (SRAM)). The memory 112 can store an operating system (OS) 116 such as a Linux OS, Unix OS, Windows OS, or any other suitable operating system, as well as a variety of software constructs realized in the form of specialized code and data such as security threat detection code and data 118, which can include at least one machine learning (ML) model 120. The security threat detection code and data 118 can be executed by the processing circuitry 110 to carry out the techniques and/or methods disclosed herein.

In the context of the processing circuitry 110 being configured to execute specialized code and data (e.g., program instructions) out of the memory 112, a computer program product can be configured to deliver all or a portion of the program instructions and/or data to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 110, the various techniques and/or methods disclosed herein.

Figure 1B:
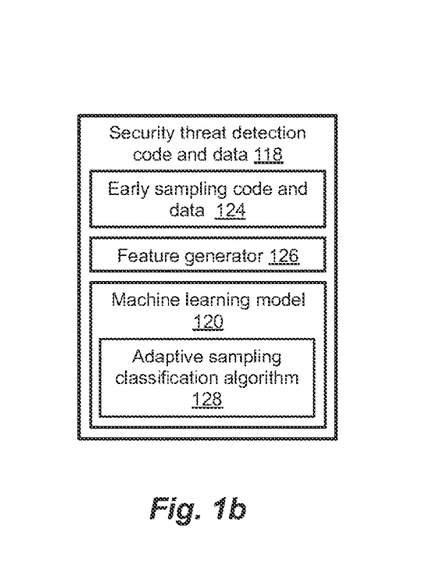
FIG. 1b is a block diagram of exemplary security threat detection code and data included in the storage system of FIG. 1a, in which the security threat detection code and data includes early sampling code and data, a feature generator, and an ML model implemented using an adaptive sampling classification algorithm.

FIG. 1*b* depicts a detailed view of the security threat detection code and data 118 stored in the memory 112 of FIG. 1*a*. As shown in FIG. 1*b*, the security threat detection code and data 118 can include early sampling code and data 124, a feature generator 126, and the ML model 120, which can be implemented using an adaptive sampling classification algorithm 128. The processing circuitry 110 can execute the early sampling code and data 124 to sample a predetermined amount, number, or percentage of a slice of successive IO (or non-IO) operations within a predefined sampling interval at the start of each slice, which can be directed to a storage object maintained on the storage device(s) 122. For example, such a sequence, stream, or slice of IO (or non-IO) operations may be initiated on the storage system 104 in response to IO (or non-IO) requests or commands from one or more of the client computers 102 or other computer(s) communicably coupled to the network(s) 106.

The feature generator 126 can be configured to generate, based on a sub-slice of sampled data, a plurality of features (or relevant features, or simply "features") relevant to detection of a security threat or attack such as a ransomware attack directed to a storage object maintained on the storage device(s) 122. In some embodiments, the relevant features can include, but are not limited to, some or all of the following twenty-seven (27) features:

- IO per second (IOPS) over a predefined sampling interval;
- the sum of read events (e.g., the total number of read IOs);
- the sum of write events (e.g., the total number of write IOs);
- the sum of all other events (e.g., the total number of non-IO operations);
- the percentage (%) of read events (e.g., % of read IOs);
- the percentage (%) of write events (e.g., % of write IOs);
- the percentage (%) of other events (e.g., % of non-IO operations);
- the average length of read IOs (or the average read IO size);
- the average length of write IOs (or the average write IO size);
- the standard deviation in read IO length (or the standard deviation of read IO sizes);
- the standard deviation in write IO length (or the standard deviation of write IO sizes);
- the average interarrival rate of any IOs (or the average time of consecutive read-write IOs);
- the average interarrival rate of read IOs (or the average time of consecutive read IOs);
- the average interarrival rate of write IOs (or the average time of consecutive write IOs);
- the average difference in logical block addresses (LBAs) between consecutive IOs (or the average delta of consecutive read-write IOs);
- the average difference in LBAs between consecutive read IOs (or the average delta of consecutive read IOs);
- the average difference in LBAs between consecutive write IOs (or the average delta of consecutive write IOs);
- the percentage (%) of consecutive IO pairs that are both read IOs (or the % of consecutive read-read IOs);
- the percentage (%) of consecutive IO pairs that include a read IO followed by a write IO (or the % of consecutive read-write IOs);
- the percentage (%) of consecutive IO pairs that include a write IO followed by a read IO (or the % of consecutive write-read IOs);
- the percentage (%) of consecutive IO pairs that are both write IOs (or the % of consecutive write-write IOs);
- the percentage (%) of consecutive read IO pairs such that the second read IO begins at an address (e.g., LBA plus read IO size) where the first read IO ended (or the % of sequential read IOs);
- the percentage (%) of consecutive write IO pairs such that the second write IO begins at an address (e.g., LBA plus write IO size) where the first write IO ended (or the % of sequential write IOs);
- the percentage (%) of consecutive IO pairs that include a read IO followed by a write IO over the same address range (or the % of immediate write IO over read IO);
- the percentage (%) of IO pairs in a sequence of size "N" (e.g., N=100) that include a read IO followed by a write IO over the same address range (or the % of delayed write IO over read IO);
- the average entropy (between "0" and "1") of an address range that was written to (or the average write entropy); and
- the average change in entropy (between "0" and "1") of an address range that was written to (or the average write entropy change).

In some embodiments, the feature generator 126 can include a plurality of in-memory counters (or simply "counters"), which act as temporary variables for generating and/or calculating the features relevant to detection of a security threat or attack involving the storage object. For example, for each IO (or non-IO) operation performed on the storage object and sampled early within the predefined sampling interval, the feature generator 126 may update (e.g., increment, decrement) one or more of the counters. By sampling successive IO (or non-IO) operations within the predefined sampling interval, relationships between the IO (or non-IO) operations pertinent to the detection of a security threat or attack directed to the storage object can be discovered. For example, such pertinent relationships may include a read IO directed to a storage object being initiated immediately at a time when a previous read IO directed to the same storage object was completed (referred to herein as a "sequential read IO"), a read IO directed to a storage object being immediately followed by a write IO directed to the same storage object (referred to herein as an "immediate write IO over read IO"), and so on.

Having sampled a plurality of successive IO (or non-IO) operations early within the specified time interval, the feature generator 126 may aggregate the counters and perform feature engineering calculations to obtain the features relevant to a security threat or attack directed to the storage object. The relevant features may be maintained on the storage device(s) 122 and applied as an input dataset to the ML model 120 to produce probability data, which may be processed to produce one or more probability scores (or classifications) indicative of a likelihood (or probability) that a security threat or attack (e.g., a ransomware attack) has occurred involving the storage object. It is noted that one or more such input datasets can be split into training data, validation data, and testing data for the adaptive sampling classification algorithm 128 used to generate the ML model 120. For example, the adaptive sampling classification algorithm 128 may be a random forest algorithm, a gradient boosting algorithm, or any other suitable ML or classification algorithm for performing a binary (or multiclass) classification task capable of identifying potential security threats or attacks (e.g., ransomware attacks).

During operation, the processing circuitry 110 of the storage system 104 can execute the security threat detection code and data 118 out of the memory 112 to perform the disclosed techniques, which can include obtaining at least one sub-slice of sampled data by performing early sampling of at least one slice of successive IO (or non-IO) operations directed to a storage object maintained on the storage device(s) 122 of the storage system 104, and generating a plurality of relevant features based on the sub-slice of sampled data. The disclosed techniques can include processing the plurality of relevant features using the ML model 120, and generating a probability score based on an output of the ML model 120. The disclosed techniques can include determining that the probability score falls within a range of overlap of continuous variable distributions (see FIG. 3, reference numerals 302, 304) for a benign class of data and a threat class of data. The disclosed techniques can include, in response to the probability score falling above a specified threshold within the range of overlap, comparing a class signature of the sub-slice of sampled data with a target class signature of the threat class of data to determine a similarity between the respective class signatures. The disclosed techniques can include, in response to the determined similarity between the respective class signatures exceeding a predetermined similarity level, assigning a "threat" class label to the probability score and optionally performing at least one remedial action on the storage system 104 to address a perceived security threat.

In some embodiments, the remedial action(s) performed on the storage system 104 can include one or more of (i) generating an alert or notification for an administrator or user of the storage system 104, (ii) suspending one or more IO (or non-IO) requests or operations directed to a storage object and/or the storage system 104, (iii) logging a plurality of relevant features for subsequent training (or retraining) of the adaptive sampling classification algorithm 128 used to generate the ML model 120, (iv) monitoring or blocking access to the storage object and/or the storage system 104 by one or more of the client computers 102 or other computer(s) on the network(s) 106, (v) requiring user input and/or authentication by the client computers 102 or other computer(s) on the network(s) to access the storage object and/or the storage system 104, (vi) applying one or more security hardening procedures to the storage devices 122, (vii) modifying one or more configurations of the storage devices 122, and/or any other suitable remedial action(s) to address the perceived security threat.

Figure 2:
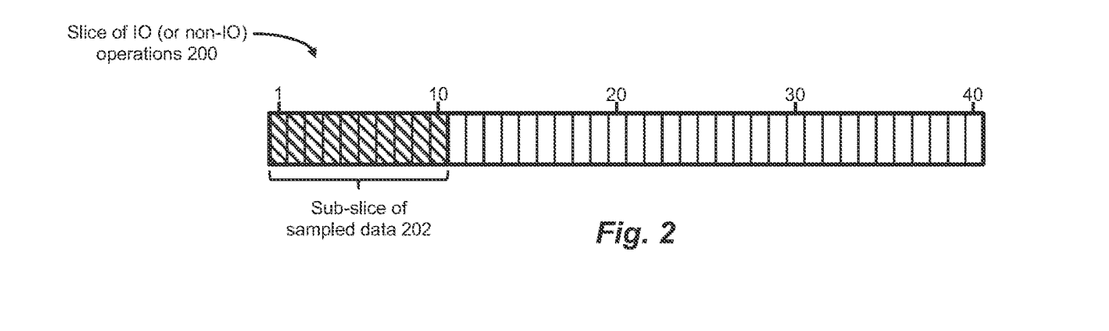
FIG. 2 is a diagram of an exemplary slice of IO (or non-IO) operations, which includes a sub-slice of sampled data.
Figure 3:
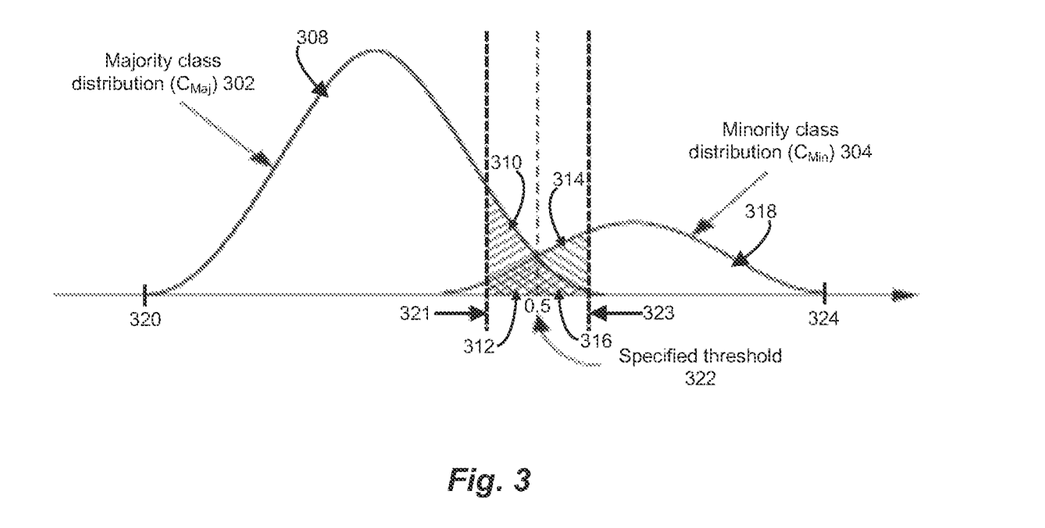
FIG. 3 is a diagram of exemplary continuous variable distributions for a benign class of data and a threat class of data.

The disclosed techniques for performing early and adaptive stream sampling for ML-based optimizations in a storage system will be further understood with reference to the following illustrative example and FIGS. 1-3. In this example, it is assumed that the processing circuitry 110 of the storage system 104 (see FIG. 1) employs the continuous variable distributions (see FIG. 3, reference numerals 302, 304) to make decisions regarding whether a security threat or attack, namely, a ransomware attack, has occurred involving a storage object maintained on the storage device(s) 122 of the storage system 104. In this example, the continuous variable distributions include a majority class distribution ($C_{Maj}$) 302 corresponding to a benign class of data, and a minority class distribution ($C_{Min}$) corresponding to a threat class of data. In this example, the majority class distribution ($C_{Maj}$) 302 and the minority class distribution ($C_{Min}$) 304 are obtained or derived from the publication, "RanSAP: An open dataset of ransomware storage access patterns for training machine learning models," Manabu Hirano et al., Forensic Science International: Digital Investigation 40 (2022) 301314, which was available online Dec. 16, 2021. It is noted, however, that any other continuous variable distributions suitable for performing binary (or multiclass) classifications may be employed.

In this example, one of the client computers 102 or another computer on the network(s) 106 sends one or more streams of IO (or non-IO) requests or commands directed to a storage object maintained on the storage device(s) 122. In response to receipt of each stream of IO (or non-IO) requests or commands, the storage system 104 initiates a sequence, stream, or slice of IO (or non-IO) operations 200 (see FIG. 2) directed to the storage object. In this example, for purposes of illustration, the slice of IO (or non-IO) operations 200 has a duration of twenty (20) minutes and includes forty (40) successive, time-ordered IO (or non-IO) operations. The processing circuitry 110 executes the early sampling code and data 124 to sample a predetermined amount, number, or percentage of IO (or non-IO) operations within a predefined sampling interval at the start of the slice of IO (or non-IO) operations 200. In this example, the processing circuitry 110 samples twenty-five percent (25%) of the forty (40) successive, time-ordered IO (or non-IO) operations within the predefined sampling interval at the start of the slice, thereby obtaining a sub-slice of sampled data 202 that corresponds to ten (10) successive, time-ordered IO (or non-IO) operations.

Having obtained the sub-slice of sampled data 200 from the slice of IO (or non-IO) operations 200, the feature generator 126 captures statistics associated with the ten (10) IO (or non-IO) operations including, but not limited to, a client identifier (ID), volume ID, timestamp, command type (e.g., read, write, copy, un-map), LBA (e.g., offset within a logical address space), and IO size for read/write IOs. Further, the feature generator 126 aggregates the counters and performs feature engineering calculations to obtain the features relevant to a potential ransomware attack involving the storage object. In this example, the relevant features include, but are not limited to, some or all of the twenty-seven (27) features listed herein. The processing circuitry 110 processes the relevant features using the ML model 120, generates a probability score for the sub-slice of sampled data 202 based on inference (or probability) data generated as output by the ML model 120, and determines where the probability score falls within certain ranges of the majority class distribution ($C_{Maj}$) and the minority class distribution ($C_{Min}$).

FIG. 3 depicts the continuous variable distributions employed by the processing circuitry 110, namely, the majority class distribution ($C_{Maj}$) 302 for the benign class of data and the minority class distribution ($C_{Min}$) 304 for the threat class of data. As shown in FIG. 3, a large class imbalance exists between the benign class represented as $C_{Maj}$ 302 and the threat class represented as $C_{Min}$ 304. In other words, the minority class distribution ($C_{Min}$) 304 for the threat class of data is orders of magnitude smaller than the majority class distribution ($C_{Maj}$) 302 for the benign class of data. In the case of ransomware, the class imbalance can be as high as one (1) to one million (1,000,000), making the determination of where a probability score falls within certain ranges of the majority class distribution ($C_{Maj}$) 302 and the minority class distribution ($C_{Min}$) 304 especially challenging.

In this example, the processing circuitry 110 determines where the probability score for the sub-slice of sampled data 202 falls within four (4) ranges of $C_{Maj}$ 302 and $C_{Min}$ 304, namely, (i) a first range ranging from reference numeral 320 to reference numeral 321, (ii) a second range ranging from reference numeral 321 to reference numeral 322, (iii) a third range ranging from reference numeral 322 to reference numeral 323, and (iv) a fourth range ranging from reference numeral 323 to reference numeral 324. In this example, reference numeral 322 corresponds to a specified threshold defined between a false negative result and a false positive result in a binary classification (e.g., "benign" versus "threat"). For example, the specified threshold 322 may be defined by default as "0.5" within a range ranging from reference numeral 321 to reference numeral 323.

In this example, if the probability score for the sub-slice of sampled data 202 is determined to fall within a region 308 of the first range, then the processing circuitry 110 assigns a "benign" class label to the probability score with a high level of confidence. Further, the processing circuitry 110 employs a lower sampling rate within the predefined sampling interval for all such sub-slices with probability scores falling within the region 308, thereby reducing processing and/or memory resource requirements of the storage system 104. If the probability score for the sub-slice of sampled data 202 is determined to fall within a region 318 of the fourth range, then the processing circuitry 110 assigns a "threat" class label to the probability score with a high level of confidence, while maintaining a higher sampling rate within the predefined sampling interval for all such sub-slices with probability scores falling within the region 318. If the probability score for the sub-slice of sampled data 202 is determined to fall within a region 310 or a region 312 of the second range, then the processing circuitry 110 assigns a "low risk" class label to the probability score, due to the large class imbalance between $C_{Maj}$ 302 and $C_{Min}$ 304. Further, the processing circuitry 110 maintains a medium sampling rate within the predefined sampling interval (e.g., between the lower and higher sampling rates) for all such sub-slices with probability scores falling within the region 310 or the region 312.

However, if the probability score for the sub-slice 202 is determined to fall within a region 314 or a region 316 of the third range, then the processing circuitry 110 assigns a "high risk" class label to the probability score, while maintaining the higher sampling rate within the predefined sampling interval for all such sub-slices with probability scores falling within the region 314 or 316. In addition, the processing circuitry 110 compares a class signature characterizing one or more features of the sub-slice of sampled data 202 in the high risk class with a target class signature characterizing the threat class of data to distinguish between probability scores that fall within the region 314 (which are indicative of a higher probability that a ransomware attack has occurred involving the storage object) and probability scores that fall within the region 316 (which are indicative of a lower probability that a ransomware attack has occurred involving the storage object). For example, such class signatures may be defined in terms of a list of top features and their relative contributions (e.g. in percentage (%)), a distribution of all feature values, a statistically significant subset of features, or any other suitable class signature definition. For example, for ransomware, the list of top features may include the percentage (%) of consecutive read-write IOs; the average write entropy; the average delta of consecutive read IOs; the average time of consecutive read IOs; the average read IO size; the average time of consecutive read-write IOs; the average IO size; the percentage (%) of consecutive write-read IOs; and, the standard deviation of read IO sizes. Further, a cosine similarity measure or any other suitable similarity measure may be employed for comparing the respective class signatures. If the processing circuitry 110 determines that the similarity between of the respective class signatures exceeds a predetermined similarity level, then it assigns the threat class label to the probability score, while maintaining the higher sampling rate within the predefined sampling interval for all such sub-slices with probability scores falling within the regions 314 and 316. Having assigned the threat class label to the probability score for the sub-slice of sampled data 202, the processing circuitry 110 performs at least one remedial action on the storage system 104, as described herein, to address a perceived security threat.

In one experimental case, the disclosed techniques were evaluated against a known ransomware dataset obtained from the publication, "RanSAP: An open dataset of ransomware storage access patterns for training machine learning models." The training data included 835 rows (80%) and the testing data included 209 rows (20%). Further, the statistics associated with IO (or non-IO) operations in each slice of IO (or non-IO) operations, as well as the set of relevant features for each sub-slice of sampled data, were the same as the statistics and relevant features described herein. Inference was performed on the trained ML model using a full set of testing data to establish a baseline for comparison, and subsequently performed using subsets of testing data and predefined sampling intervals of 30 seconds, 45 seconds, 60 seconds, and 75 seconds. The classification algorithm used to generate the ML model was the random forest algorithm.

In this experimental case, the percent (%) accuracy of binary classification ("benign" versus "threat") using the trained ML model is provided in the TABLE below.

TABLE

| | Full set of testing data | 75 second sampling interval | 60 second sampling interval | 45 second sampling interval | 30 second sampling interval |
|---|---|---|---|---|---|
| ML Model accuracy without using class signatures | 100% | 98.08% | 93.78% | 92.34% | 84.69% |
| ML Model accuracy using class signatures with 40% similarity | 100% | 100% | 96.17% | 94.27% | 85.17% |
| ML Model accuracy using class signatures with 60% similarity | 100% | 100% | 96.17% | 94.27% | 84.69% |

As shown in the TABLE, the percent (%) accuracy of binary classification using the predefined sampling interval of 75 seconds, but without using class signatures, is close to the percent (%) accuracy achieved using the full set of testing data, i.e., 98.08% accuracy using the 75 second sampling interval and 100% accuracy using the full set of testing data. Further, using class signatures with either 40% or 60% cosine similarity, the percent (%) accuracy of binary classification using the predefined sampling interval of 75 seconds is substantially the same as the percent (%) accuracy achieved using the full set of testing data, i.e., 100%. It is noted, however, that there were certain reductions in the percent (%) accuracy of binary classification using the predefined sampling intervals of 60 seconds, 45 seconds, and 30 seconds.

It is noted that such reductions in accuracy of binary classification using the trained ML model can be addressed or alleviated by determining a more optimal sampling interval for performing early sampling of a slice of successive IO (or non-IO) operations. In one approach, a more optimal sampling interval can be determined by iteratively increasing the sampling interval and comparing the resulting accuracy of binary classification with the accuracy achieved using the full set of testing data, until an acceptable tradeoff is reached between the performance of the ML model and the cost of sampling. A similar approach can be used to determine a more optimal similarity measure for use in comparing respective class signatures. In another approach, a model signature can be employed and defined, for an entire trained ML model, in terms of a list of top features and their relative contributions (e.g. in percentage (%)), a distribution of all feature values, a statistically significant subset of features, or any other suitable model signature definition. In this approach, a model signature for a sub-slice of sampled data within a short sampling interval (e.g., 30 seconds) can be compared with an overall model signature for a slice of IO (or non-IO) operations from which the sub-slice of sampled data was obtained. If, in response to the comparison, it is determined that the difference between the respective model signatures exceeds a predetermined similarity level, then the sampling interval can be iteratively increased until a desired model similarity is achieved. It is further noted that each of these approaches for determining a more optimal sampling interval can be performed as a postprocessing step following training of the ML model (e.g., in the "cloud").

Figure 4:
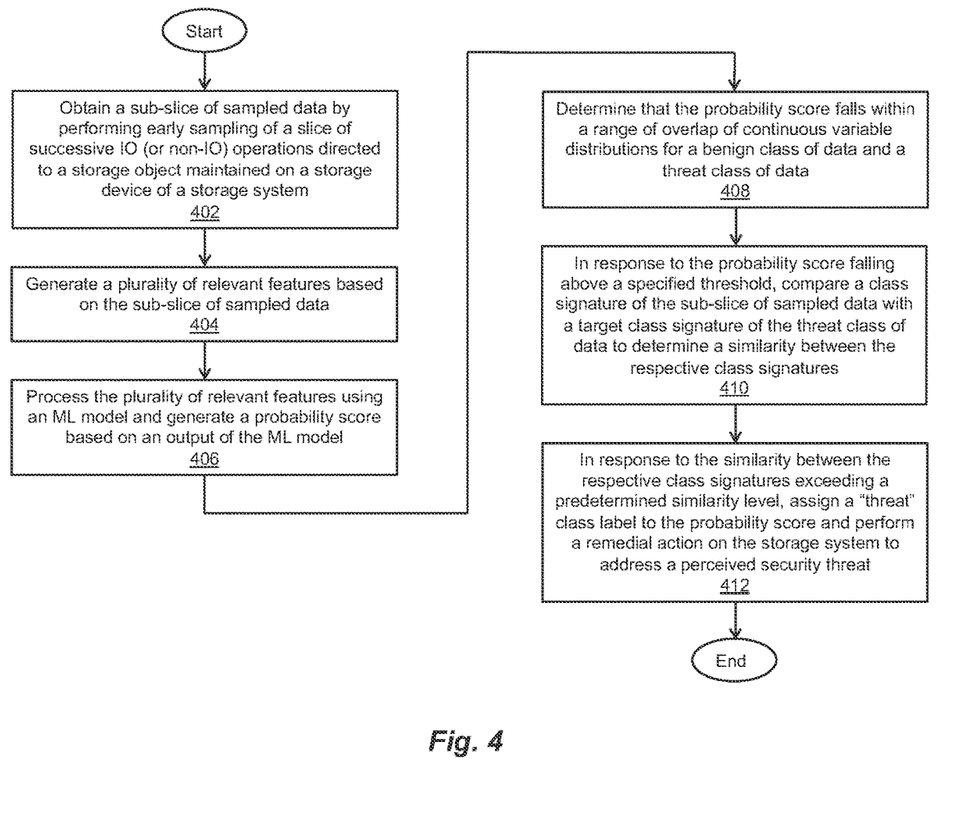
FIG. 4 is a flow diagram of an exemplary method of performing early and adaptive stream sampling for ML-based optimizations in a storage system.

A method of performing early and adaptive IO stream sampling for ML-based optimizations in storage systems is described below with reference to FIG. 4. As depicted in block 402, a sub-slice of sampled data is obtained by performing early sampling of a slice of successive IO (or non-IO) operations directed to a storage object maintained on a storage device of a storage system. As depicted in block 404, a plurality of relevant features is generated based on the sub-slice of sampled data. As depicted in block 406, the plurality of relevant features is processed using an ML model and a probability score is generated based on an output of the ML model. As depicted in block 408, the probability score is determined to fall within a range of overlap of continuous variable distributions for a benign class of data and a threat class of data. As depicted in block 410, in response to the probability score falling above a specified threshold, a class signature of the sub-slice of sampled data is compared with a target class signature of the threat class of data to determine a similarity between the respective class signatures. As depicted in block 412, in response to the similarity between the respective class signatures exceeding a predetermined similarity level, a "threat" class label is assigned to the probability score and a remedial action is performed on the storage system to address a perceived security threat.

Having described the above illustrative embodiments, various alternative embodiments and/or variations may be made and/or practiced. For example, it was described herein that a specified threshold between a false negative result and a false positive result in a binary classification (e.g., "benign" versus "threat") may be defined by default as "0.5." In some embodiments, the specified threshold in a binary (or multiclass) classification can be tuned to a value greater than "0.5" to increase the prevalence of false positives, or tuned to a value less than "0.5" to increase the prevalence of false negatives but assure detection of all potential ransomware attacks.

It was further described herein that a probability score for a sub-slice of sampled data may be determined to fall within a range of overlap of continuous variable distributions for a benign class of data (e.g., $C_{Maj}$ 302; see FIG. 3) and a threat class of data (e.g., $C_{Min}$ 304; see FIG. 3), and, in response to the probability score falling above a specified threshold, a class signature of the sub-slice may be compared with a target class signature of the threat class of data to determine a similarity between the respective class signatures. In this way, the disclosed techniques can better determine whether a probability score that falls within the range of overlap is indicative of a lower probability or a higher probability that a ransomware attack has occurred. In some embodiments, the two (2) ranges of $C_{Maj}$ 302 and $C_{Min}$ 304 ranging from reference numeral 321 to reference numeral 322, and ranging from reference numeral 322 to reference numeral 323, may be widened to increase a level of confidence in assigning the high risk class label or the threat class label to the probability score, at the cost of some additional processing overhead.

It was further described herein that, if a benign class label has been assigned to a probability score for a sub-slice of sampled data that falls within a particular region (or range) of continuous variable distributions, then a reduced sampling rate within a predefined sampling interval may be employed for all such sub-slices with probability scores falling within the same region (or range). In some embodiments, if performance of the storage system 104 is under pressure and/or processing and/or memory resources are limited, then the sampling rate and/or the predefined sampling interval may be reduced, at the cost of some loss of accuracy in class label assignments.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of detecting a security threat in a storage system using a machine learning (ML) model, comprising:
   obtaining a sub-slice of sampled data by performing early sampling of a slice of successive input/output (IO) or non-IO operations directed to a storage object maintained on a storage device of a storage system;
   generating a plurality of features based on the sub-slice of sampled data;
   processing the plurality of features using an ML model;
   generating a probability score for the sub-slice of sampled data based on an output of the ML model;
   determining that the probability score falls within a range of overlap of continuous variable distributions for a benign class of data and a threat class of data;
   in response to the probability score falling above a specified threshold within the range of overlap, comparing a class signature of the sub-slice of sampled data with a class signature of the threat class of data to determine a similarity between the respective class signatures; and
   in response to the similarity between the respective class signatures exceeding a predetermined similarity level, assigning a "threat" class label to the probability score, and performing a remedial action on the storage system to address a perceived security threat involving the storage object.

2. The method of claim 1 wherein performing early sampling of the slice of successive IO or non-IO operations includes sampling a predetermined percentage of IO or non-IO operations within a predefined sampling interval at a start of the slice of successive IO or non-IO operations.

3. The method of claim 2 wherein the continuous variable distributions include a majority class distribution for the benign class of data and a minority class distribution for the threat class of data, wherein the range of overlap includes a first range of overlap below the specified threshold and a second range of overlap above the specified threshold, and wherein determining that the probability score falls within the range of overlap of continuous variable distributions includes determining where the probability score falls within one of the first range of overlap and the second range of overlap.

4. The method of claim 3 further comprising:
   in response to the probability score falling within the first range of overlap, assigning a "low risk" class label to the probability score.

5. The method of claim 4 further comprising:
   in response to the probability score falling within the second range of overlap and the similarity between the respective class signatures being less than the predetermined similarity level, assigning a "high risk" class label to the probability score.

6. The method of claim 5 further comprising:
   in response to assigning the "high risk" class label to the probability score, maintaining a high sampling rate within the predefined sampling interval.

7. The method of claim 6 further comprising:
   in response to assigning the "low risk" class label to the probability score, maintaining a medium sampling rate within the predefined sampling interval, the medium sampling rate being less than the high sampling rate.

8. The method of claim 7 further comprising:
   in response to the probability score falling below the specified threshold outside the range of overlap, maintaining a low sampling rate within the predefined sampling interval, the low sampling rate being less than the medium sampling rate.

9. A system for detecting a security threat in a storage system using a machine learning (ML) model, comprising:
   a memory; and
   processing circuitry configured to execute program instructions out of the memory to:
      obtain a sub-slice of sampled data by performing early sampling of a slice of successive input/output (IO) or non-IO operations directed to a storage object maintained on a storage device of a storage system;
      generate a plurality of features based on the sub-slice of sampled data;

process the plurality of features using an ML model;
generate a probability score for the sub-slice of sampled data based on an output of the ML model;
determine that the probability score falls within a range of overlap of continuous variable distributions for a benign class of data and a threat class of data;
in response to the probability score falling above a specified threshold within the range of overlap, compare a class signature of the sub-slice of sampled data with a class signature of the threat class of data to determine a similarity between the respective class signatures; and
in response to the similarity between the respective class signatures exceeding a predetermined similarity level, assign a "threat" class label to the probability score, and performing a remedial action on the storage system to address a perceived security threat involving the storage object.

10. The system of claim 9 wherein the processing circuitry is further configured to execute the program instructions out of the memory to sample a predetermined percentage of IO or non-IO operations within a predefined sampling interval at a start of the slice of successive IO or non-IO operations.

11. The system of claim 10 wherein the continuous variable distributions include a majority class distribution for the benign class of data and a minority class distribution for the threat class of data, wherein the range of overlap includes a first range of overlap below the specified threshold and a second range of overlap above the specified threshold, and wherein the processing circuitry is further configured to execute the program instructions out of the memory to determine where the probability score falls within one of the first range of overlap and the second range of overlap.

12. The system of claim 11 wherein the processing circuitry is further configured to execute the program instructions out of the memory to:
in response to the probability score falling within the first range of overlap, assign a "low risk" class label to the probability score.

13. The system of claim 12 wherein the processing circuitry is further configured to execute the program instructions out of the memory to:
in response to the probability score falling within the second range of overlap and the similarity between the respective class signatures being less than the predetermined similarity level, assign a "high risk" class label to the probability score.

14. The system of claim 13 wherein the processing circuitry is further configured to execute the program instructions out of the memory to:
in response to assigning the "high risk" class label to the probability score, maintain a high sampling rate within the predefined sampling interval.

15. The system of claim 14 wherein the processing circuitry is further configured to execute the program instructions out of the memory to:
in response to assigning the "low risk" class label to the probability score, maintain a medium sampling rate within the predefined sampling interval, the medium sampling rate being less than the high sampling rate.

16. The system of claim 15 wherein the processing circuitry is further configured to execute the program instructions out of the memory to:
in response to the probability score falling below the specified threshold outside the range of overlap, maintain a low sampling rate within the predefined sampling interval, the low sampling rate being less than the medium sampling rate.

17. A computer program product including a set of non-transitory, computer-readable media having instructions that, when executed by processing circuitry, cause the processing circuitry to perform a method comprising:
obtaining a sub-slice of sampled data by performing early sampling of a slice of successive input/output (IO) or non-IO operations directed to a storage object maintained on a storage device of a storage system;
generating a plurality of features based on the sub-slice of sampled data;
processing the plurality of features using an ML model;
generating a probability score for the sub-slice of sampled data based on an output of the ML model;
determining that the probability score falls within a range of overlap of continuous variable distributions for a benign class of data and a threat class of data;
in response to the probability score falling above a specified threshold within the range of overlap, comparing a class signature of the sub-slice of sampled data with a class signature of the threat class of data to determine a similarity between the respective class signatures; and
in response to the similarity between the respective class signatures exceeding a predetermined similarity level, assigning a "threat" class label to the probability score, and performing a remedial action on the storage system to address a perceived security threat involving the storage object.

18. The computer program product of claim 17 wherein performing early sampling of the slice of successive IO or non-IO operations includes sampling a predetermined percentage of IO or non-IO operations within a predefined sampling interval at a start of the slice of successive IO or non-IO operations.

19. The computer program product of claim 18 wherein the continuous variable distributions include a majority class distribution for the benign class of data and a minority class distribution for the threat class of data, wherein the range of overlap includes a first range of overlap below the specified threshold and a second range of overlap above the specified threshold, and wherein determining that the probability score falls within the range of overlap of continuous variable distributions includes determining where the probability score falls within one of the first range of overlap and the second range of overlap.

20. The computer program product of claim 19 wherein the method further comprises:
in response to the probability score falling within the first range of overlap, assigning a "low risk" class label to the probability score; and
in response to the probability score falling within the second range of overlap and the similarity between the respective class signatures being less than the predetermined similarity level, assigning a "high risk" class label to the probability score.

* * * * *